US010087869B2

(12) United States Patent
Tullock

(10) Patent No.: US 10,087,869 B2
(45) Date of Patent: Oct. 2, 2018

(54) VEHICLE ANTI-LOCK EXHAUST BRAKE CONTROL SYSTEM

(71) Applicant: NISSAN NORTH AMERICA, INC., Franklin, TN (US)

(72) Inventor: Zachary Tullock, Ann Arbor, MI (US)

(73) Assignee: Nissan North America, Inc., Franklin, TN (US)

( * ) Notice: Subject to any disclaimer, the term of this patent is extended or adjusted under 35 U.S.C. 154(b) by 118 days.

(21) Appl. No.: 15/086,831

(22) Filed: Mar. 31, 2016

(65) Prior Publication Data

US 2017/0284309 A1  Oct. 5, 2017

(51) Int. Cl.
*F02D 41/00* (2006.01)
*F02D 41/26* (2006.01)

(52) U.S. Cl.
CPC ......... *F02D 41/26* (2013.01); *F02D 41/0007* (2013.01); *F02D 2200/501* (2013.01); *F02D 2250/18* (2013.01); *F02D 2250/34* (2013.01)

(58) Field of Classification Search
CPC .............. F06D 9/06; B60T 8/17; B60T 8/176
See application file for complete search history.

(56) References Cited

U.S. PATENT DOCUMENTS

| 3,838,890 | A | * | 10/1974 | Wind | ..................... | B60T 8/1708 |
| | | | | | | 188/181 A |
| 4,460,220 | A | * | 7/1984 | Petersen | ................. | B60T 8/349 |
| | | | | | | 303/113.5 |
| 5,130,928 | A | * | 7/1992 | Petersen | ............ | B60K 23/0808 |
| | | | | | | 180/197 |
| 5,884,986 | A | * | 3/1999 | Shimizu | ................ | B60T 8/4036 |
| | | | | | | 303/10 |
| 6,935,707 | B2 | * | 8/2005 | Ruhnau | ................. | B60T 8/1708 |
| | | | | | | 303/122.08 |
| 8,108,117 | B2 | * | 1/2012 | Lingman | ............... | B60T 8/1708 |
| | | | | | | 303/9.69 |
| 9,193,339 | B2 | * | 11/2015 | Yao | ........................ | B60T 8/3215 |
| 9,327,731 | B2 | * | 5/2016 | Keeney | .................... | B60T 1/10 |
| 2011/0011081 | A1 | * | 1/2011 | Quigley | .................... | F02D 9/06 |
| | | | | | | 60/600 |
| 2011/0130937 | A1 | * | 6/2011 | Krueger | .................... | B60L 3/10 |
| | | | | | | 701/74 |
| 2011/0276245 | A1 | * | 11/2011 | Krueger | ............. | B60T 8/17616 |
| | | | | | | 701/71 |

(Continued)

FOREIGN PATENT DOCUMENTS

| JP | H0820324 A | 1/1996 |
| JP | H0848232 A | 2/1996 |
| JP | H1111291 A | 1/1999 |

*Primary Examiner* — Hieu T Vo
*Assistant Examiner* — Sherman Manley
(74) *Attorney, Agent, or Firm* — Young Basile Hanlon & MacFarlane, P.C.

(57) ABSTRACT

A method of exhaust braking a vehicle includes determining a wheel slip ratio based on input from vehicle sensors. Based on a determination that the wheel slip ratio is unstable, the method further includes sending a command to reduce exhaust braking. Based on a determination that exhaust braking is reduced, the method further includes determining a change in wheel slip ratio over time based on input from the vehicle sensors. Based on a determination that the change in wheel slip ratio over time is stabilizing, the method further includes sending a command to increase exhaust braking.

20 Claims, 4 Drawing Sheets

(56) References Cited

U.S. PATENT DOCUMENTS

2014/0324316 A1* 10/2014 Yao .................. B60T 8/175
 701/78
2014/0358395 A1* 12/2014 Harrison ............ B60T 8/1708
 701/78

* cited by examiner

VEHICLE ANTI-LOCK EXHAUST BRAKE CONTROL SYSTEM

TECHNICAL FIELD

This disclosure relates generally to vehicle braking control systems and, more specifically, to control systems for vehicle exhaust braking.

BACKGROUND

Wheel-based vehicle braking systems, or service brakes, apply braking force to slow and/or stop a vehicle's wheels at the direction of the driver or a controller, for example, using brake calipers and brake pads to inhibit rotation of brake rotors in response to actuation of a brake pedal. Anti-lock braking systems (ABS) prevent locking or excessive slipping of the vehicle's wheels during application of service braking force, improving service brake feel and control of the vehicle for the driver. Anti-lock service braking, for example, in the form of modulation of service braking force, can be automatically initiated by an ABS controller based on a threshold difference between wheel speed and vehicle speed over a predetermined time period. That is, anti-lock service braking is implemented when a wheel-slip threshold is reached.

Exhaust-based vehicle braking systems, or exhaust brakes, restrict the flow of exhaust from an engine in order to reduce engine speed and hence propulsion torque supplied by the engine, for example, using a valve within an exhaust component or within a turbocharger component located downstream from the engine. Exhaust braking can be used alone or in combination with service braking, for example, in commercial vehicles, to slow the vehicle more efficiently and increase the life of service braking components. However, existing control features for exhaust braking include only restriction of the maximum level of exhaust braking to avoid wheel slip, activation of exhaust braking only during the presence of traditional service braking, and deactivation of exhaust braking during the presence of anti-lock service braking. More sophisticated control systems for exhaust braking are thus desired.

SUMMARY

Disclosed herein are aspects of vehicle anti-lock exhaust braking control. One aspect of the disclosure is a method of exhaust braking a vehicle comprising determining a wheel slip ratio based on input from vehicle sensors. Based on a determination that the wheel slip ratio is unstable, the method includes sending a command to reduce exhaust braking. Based on a determination that exhaust braking is reduced, the method includes determining a change in wheel slip ratio over time based on input from the vehicle sensors. Based on a determination that the change in wheel slip ratio over time is stabilizing, the method includes sending a command to increase exhaust braking.

Another aspect of the disclosure is a controlling component. The controlling component includes a non-transitory memory and a processor configured to execute instructions stored in the non-transitory memory to determine a wheel slip ratio based on input from vehicle sensors. Based on a determination that the wheel slip ratio is unstable, the processor is configured to send a command to reduce exhaust braking. Based on a determination that exhaust braking is reduced, the processor is configured to determine a change in wheel slip ratio over time based on input from the vehicle sensors. Based on a determination that the change in wheel slip ratio over time is stabilizing, the processor is configured to send a command to increase exhaust braking.

Another aspect of the disclosure is a vehicle. The vehicle includes sensors disposed on the vehicle and a controlling component in communication with the vehicle sensors. The controlling component includes a non-transitory memory and a processor configured to execute instructions stored in the non-transitory memory to determine a wheel slip ratio based on input from the vehicle sensors. Based on a determination that the wheel slip ratio is unstable, the processor is configured to send a command to reduce exhaust braking. Based on a determination that the wheel slip ratio is stable, the processor is configured to maintain exhaust braking at a current level. Based on a determination that exhaust braking is reduced, the processor is configured to determine a change in wheel slip ratio over time based on input from the vehicle sensors. Based on a determination that the change in wheel slip ratio over time is stabilizing, the processor is configured to send a command to increase exhaust braking. Based on a determination that the change in wheel slip ratio over time is not stabilizing, the processor is configured to send a command to the vehicle controller to further reduce exhaust braking.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

An anti-lock exhaust braking process and a controller for implementing the anti-lock exhaust braking process are described herein. While exhaust braking is active, the controller can determine a wheel slip ratio, k, whether the wheel slip ratio, k, is within a stable range, and whether a change in wheel slip ratio, k, over time indicates that the wheel slip ratio, k, is headed toward or away from the stable range. Based on these determinations, exhaust braking can be increased or decreased through commands sent by the controller to move the position of restriction components in the exhaust system or a turbocharger in order to move the wheel slip ratio, k, toward stability while at the same time maximizing the exhaust braking effect.

Figure 1:
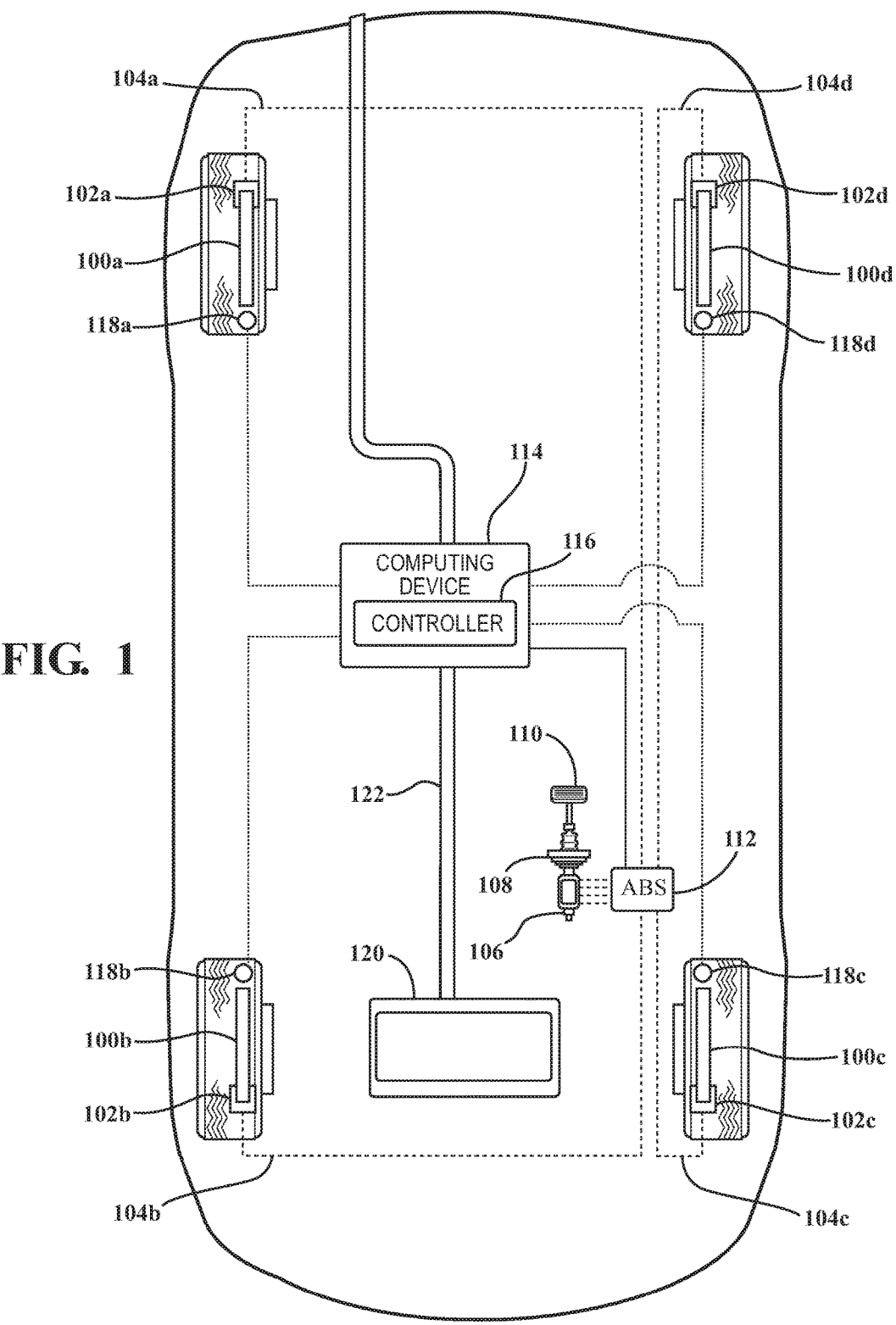
FIG. 1 is a schematic diagram of a vehicle service braking system and an exhaust braking system configured to implement an anti-lock exhaust braking process.

FIG. 1 is a schematic diagram of a vehicle service braking system and an exhaust braking system configured to implement an anti-lock exhaust braking process. The service braking system comprises rotors 100a-d, calipers 102a-d, and hydraulic brake lines 104a-d in fluid communication with a master cylinder 106. The master cylinder 106 is connected to a brake booster 108 and receives an input, for example, from a service brake pedal 110. To operate the service braking system, the service brake pedal 110 is depressed by the vehicle operator to send hydraulic fluid through the hydraulic brake lines 104a-d in order to apply service braking pressure to the rotors 100a-d using the calipers 102a-d.

To implement anti-lock service braking using the service braking system, an ABS control component 112 can be in communication with a computing device 114 housing a central controlling component, such as a controller 116. The computing device 114 can be in communication with one or more vehicle sensors, such as wheel speed sensors 118a-d. The controller 116 (or the ABS control component 112) can receive wheel speed information from the wheel speed sensors 118a-d for comparison to vehicle speed in order to determine the amount of wheel slip at a given wheel, that is, the difference between wheel speed and vehicle speed as compared to overall vehicle speed. The controller 116 or the ABS control component 112 can then use wheel slip information to determine when modulation of service braking pressure should occur in order to prevent wheel lockup and improve the driver's control of the vehicle while service braking.

The computing device 114 can be a single computing device or can be composed of multiple computing devices. A processing unit in the computing device 114 can be a conventional central processing unit (CPU) or any other type of device, or multiple devices, capable of manipulating or processing information. A memory in the computing device 114 can be a random access memory device (RAM) or any other suitable type of storage device. The memory can include data that is accessed by the CPU using a bus.

The memory can also include an operating system and installed applications, the installed applications including the controller 116 that permits the CPU to implement the anti-lock service braking process described above and the anti-lock exhaust braking processes described below. The computing device 114 can also include secondary, additional, or external storage, for example, a memory card, flash drive, or any other form of computer readable medium. In one embodiment, the installed applications including the controller 116 can be stored in whole or in part in the external storage and loaded into the memory as needed for processing.

The exhaust braking system comprises the controller 116, an engine 120, and an exhaust system 122. The exhaust system 122 can include one or more components, such as a valve (not shown) or a turbocharger (not shown), that allow variation in position, shape, etc. based on input received from the controller 116. In operation, the exhaust braking system can restrict the flow of exhaust through the exhaust system 122 at the command of the controller 116 in order to reduce the torque level of the engine 120 and reduce the speed of the vehicle.

The controller 116 can also receive vehicle information from various vehicle sensors or systems that can influence the implementation of exhaust braking. For example, the controller 116 can receive service braking and anti-lock service braking status indicators from the ABS control component 112, wheel speeds from the wheel speed sensors 118a-d, a torque level from the engine 120, and a position of the valve or other components restricting or allowing exhaust flow within the exhaust system 122. The controller 116 also has access to other vehicle parameters such as a current gear ratio from a transmission (not shown), a two-wheel drive or four wheel drive status from a transfer case (not shown), a steering angle from a steering angle sensor (not shown), etc. The vehicle information provided to the controller 116 enables implementation of the exhaust braking processes described further below.

Figure 2:
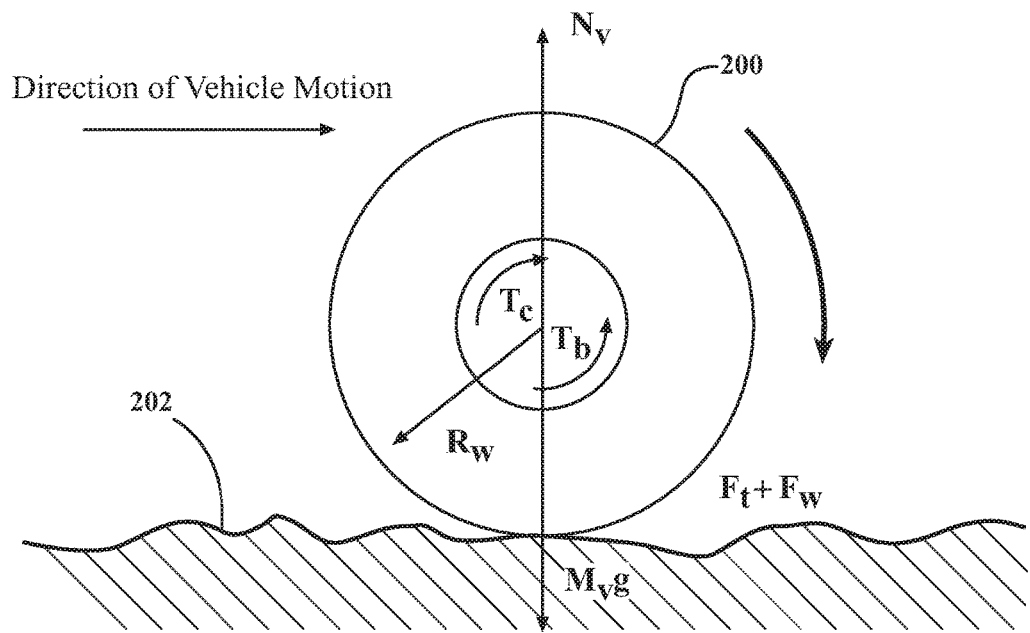
FIG. 2 is a schematic diagram of typical forces acting on a wheel during vehicle operation.

FIG. 2 is a schematic diagram of typical forces acting on a wheel 200 during vehicle operation. The wheel 200 has a radius, $R_w$, and rotates clockwise about a central axis as the vehicle traverses the ground 202. A gravitational force of the vehicle, $M_v g$, opposes a normal force of the vehicle, $N_v$. As the wheel 200 rotates, both a tractive force, Ft, and a viscous force, Fw, oppose motion of the wheel 200 at the interface with the ground 202. The tractive force, Ft, is the product of the normal force of the vehicle, $N_v$, and an adhesion coefficient, µ, of the surface, that is, the ground 202. The adhesion coefficient, µ, will vary depending on tire materials and tread patterns and surface properties of the ground 202, such as whether the surface is dry, wet, snowy, or icy as well as whether the surface is formed from concrete, asphalt, gravel, sand, grass, etc.

During vehicle operation, the engine 120 supplies torque, Te, to drive the wheel 200, and the calipers 102a-d in the service braking system supply torque, Tb, in an opposing direction to that supplied by the engine 120 to impede movement of the wheel 200. The change in angular velocity of the wheel 200 over time, $\dot{\omega}_w$, is a function of each of the above-described parameters and the moment of inertia of the wheel, $J_w$, as shown in equation 1.

$$\dot{\omega}_w = \frac{T_e - T_b - R_w F_t - R_w F_w}{J_w} \quad (1)$$

Figure 3:
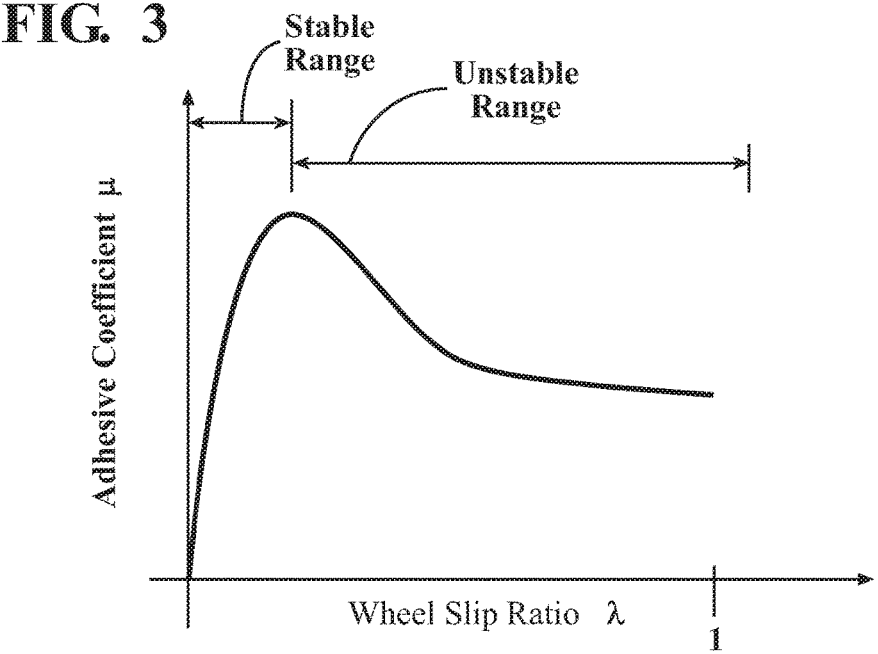
FIG. 3 is a graphical representation of wheel slip ratio compared to adhesion coefficient for the wheel and ground of FIG. 2.

FIG. 3 is a graphical representation of wheel slip ratio, λ, compared to adhesion coefficient, µ, for the wheel 200 and the ground 202 of FIG. 2. The wheel slip ratio, k, indicates how much the wheel 200 is slipping in respect to the vehicle and the ground 202. The wheel slip ratio, λ, is a function of wheel angular velocity, $\omega_w$, as described in respect to FIG. 2, vehicle angular velocity, $\omega_v$, and the difference between the two as shown in equation 2.

$$\lambda = \frac{(\omega_w - \omega_v)}{\max(\omega_w, \omega_v)} \quad (2)$$

The vehicle's angular velocity, $\omega_v$, is the vehicle's velocity, V, divided by the radius of the wheel 200, $R_w$. Thus, the wheel slip ratio, λ, has a value between zero and one. For a given adhesion coefficient, µ, the wheel slip ratio, λ, has a stable range where the adhesion coefficient, µ, increases as the wheel slip ratio, λ, increases and an unstable range where the adhesion coefficient, µ, decreases as the wheel slip ratio, λ, increases.

The curve shown in FIG. 3 for the adhesion coefficient, µ, and the wheel slip ratio, λ, is only an example that is used to indicate that the wheel slip ratio, λ, includes a stable range made up of relatively low values, for example, between 0.05 and 0.25, and depends on the surface characteristics of both the wheel 200 (through the tire) and the ground 202. In some examples, the stable range could include values for the wheel slip ratio, $\lambda$, between zero and 0.15. In other examples, the stable range could include values for the wheel slip ratio, $\lambda$, between 0.10 and 0.30. In short, the stable range for the wheel slip ratio, $\lambda$, will depend both on environmental and vehicle-based properties.

Figure 4A:
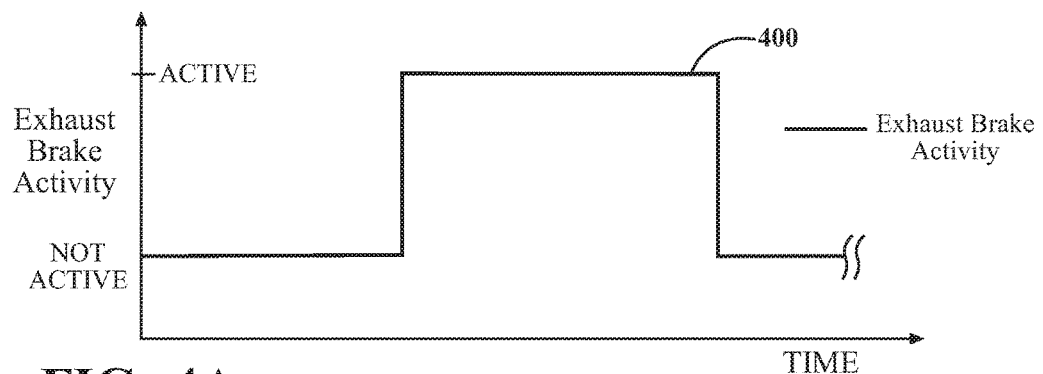
FIGS. 4A-4C are graphical representations of exhaust brake activity, wheel speed, and engine torque during anti-lock exhaust braking implemented using the exhaust braking system of FIG. 1.
Figure 4B:
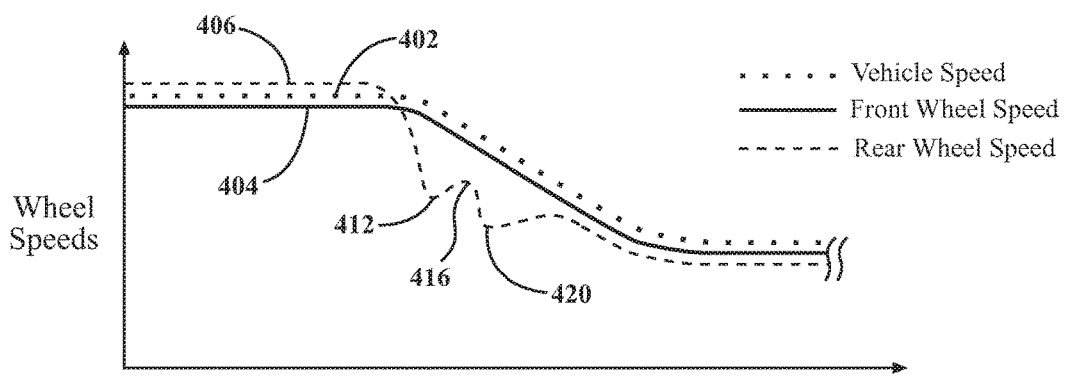
Figure 4C:
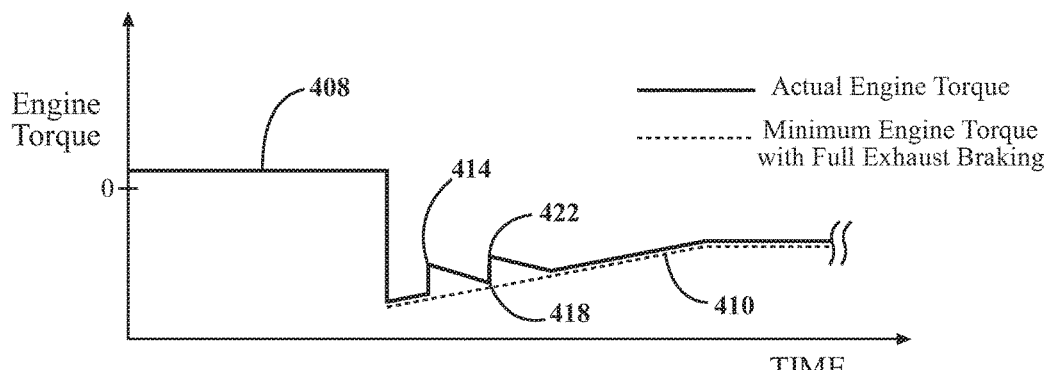

FIGS. 4A-4C are graphical representations of exhaust brake activity, wheel speed, and engine torque during anti-lock exhaust braking implemented using the exhaust braking system of FIG. 1. The traces in the FIGS. 4A-4C occur during the same time span. An exhaust brake activity curve 400 in FIG. 4A indicates whether exhaust braking is active or not active. A vehicle speed curve 402, a front wheel speed curve 404, and a rear wheel speed curve 406 in FIG. 4B indicate whether excessive wheel slip occurs outside of the stable range described in FIG. 3. Finally, an engine torque curve 408 in FIG. 4C indicates the effect of anti-lock exhaust braking on the torque output of the engine 120 as compared to a minimum engine torque curve 410 that corresponds to a maximum exhaust braking capability.

Comparing FIG. 4B to FIG. 4A, the vehicle speed curve 402 and the front wheel speed curve 404 begin to decrease over time once exhaust braking is activated per the exhaust brake activity curve 400. In other words, when a restriction occurs in the exhaust system 122, torque output of the engine 120 decreases, and the vehicle slows down. The front wheel speed curve 404 follows the vehicle speed curve 402, indicating that the front wheels have sufficient traction and excessive slipping does not occur for the front wheels. However, the rear wheel speed curve 406 drops quickly to a relative low point 412 when compared to both the vehicle speed curve 402 and the front wheel speed curve 404, indicating that a wheel slip ratio, $\lambda$, outside of the stable range has been encountered and that a change in exhaust braking activity can be used to return the rear wheels to a more stable, reduced slip condition.

Comparing FIG. 4C to FIGS. 4A and 4B, the engine torque curve 408 drops rapidly to nearly meet the minimum engine torque curve 410 upon activation of the exhaust brake per the exhaust brake activity curve 400. However, once the rear wheel speed curve 406 drops to the relative low point 412, the controller 116 can determine that the wheel slip ratio, $\lambda$, is unstable and send a command to ease restriction of the exhaust flow through the exhaust system 122, reducing exhaust braking and allowing the engine torque curve 408 to increase to a relative high point 414. In other words, the engine torque curve 408 increases to the relative high point 414 based on the reduction in exhaust braking.

Once exhaust braking has been reduced, the controller 116 can determine a change in the wheel slip ratio, $\lambda$, over time. For example, based on the reduction in exhaust braking, the rear wheel speed curve 406 in FIG. 4B can move from the relative low point 412 to a relative high point 416 reflecting a reduction in the wheel slip ratio, $\lambda$, over time which is indicative of the wheel slip ratio, $\lambda$, heading toward the stable range as shown in FIG. 3. Correspondingly, and based on a determination that the change in wheel slip ratio, $\lambda$, is stabilizing, the controller 116 can send a command to the exhaust system 122 to increase exhaust braking. Upon an increase in exhaust braking, the engine torque curve 408 can move from the relative high point 414 to a relative low point 418. The relative low point 418 is again near the minimum engine torque curve 410.

The process can be repeated, for example, if the controller 116 determines that the wheel slip ratio, $\lambda$, again becomes unstable due to the increase in exhaust braking. For example, when the rear wheel speed curve 406 moves from the relative high point 416 to a relative low point 420, indicating instability, the controller 116 can send a command to the exhaust system 122 to reduce exhaust braking, and the engine torque curve 408 can move from the relative low point 418 to a relative high point 422. Use by the controller 116 of the wheel slip ratio, k and the change in the wheel slip ratio, $\lambda$, over time to tune the amount of exhaust braking provides an improved control mechanism that avoids excessive wheel slip (i.e., performs an anti-lock feature) while at the same time maximizing the use of exhaust braking.

Figure 5:
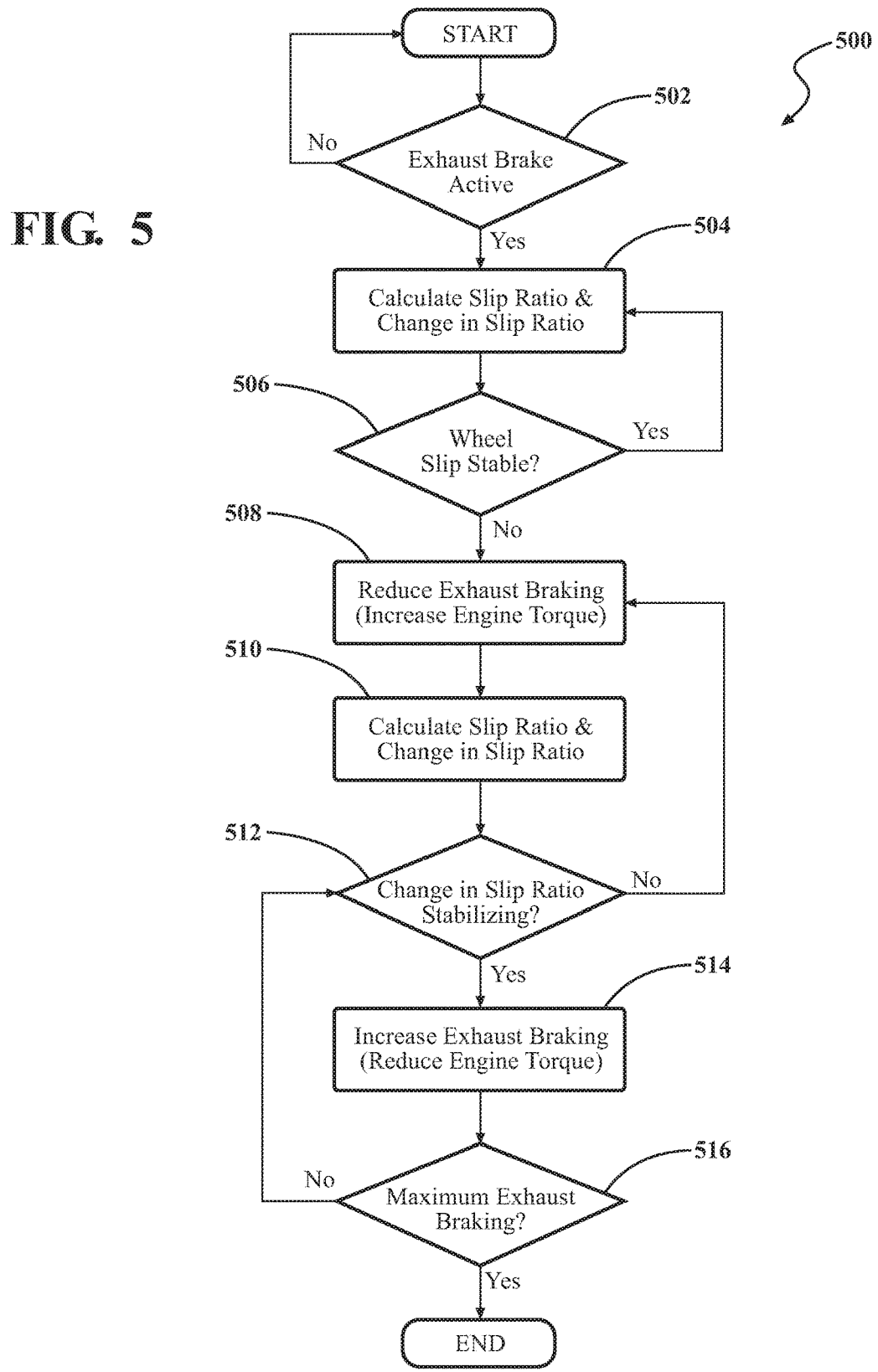
FIG. 5 is a flowchart of an anti-lock exhaust braking process implemented using the exhaust braking system of FIG. 1.

FIG. 5 is a flowchart of an anti-lock exhaust braking process 500 implemented using the exhaust braking system of FIG. 1. In decision block 502, the controller 116 determines whether exhaust braking is active. If exhaust braking is not active, the process 500 returns to the start, waiting until exhaust braking is active to continue. If exhaust braking is active, the process 500 continues to operation 504, and the controller 116 determines a wheel slip ratio, $\lambda$, and optionally, a change in wheel slip ratio, $\lambda$, over time, based, for example, on input from vehicle sensors such as the wheel speed sensors 118a-d or sensors associated with the ABS control component 112, the engine 120, the transmission, the transfer case, etc. Determination can include estimation or calculation based, for example, on signal data captured by various sensors such as the wheel speed sensors 118a-d.

In decision block 506, the controller 116 determines whether the wheel slip ratio, $\lambda$, is stable. A stable wheel slip ratio, $\lambda$, is one that lies within the stable range shown, for example, in FIG. 3. As described above, the stable range will depend on characteristics of the vehicle and tire as well as characteristics of the surface upon which the vehicle travels. An unstable wheel slip ratio, $\lambda$, can be determined based one or more factors: a predetermined drop in speed for one or more wheels of the vehicle as compared to a vehicle speed, the wheel slip ratio, $\lambda$, being outside of the stable range, and the change in wheel slip ratio, $\lambda$, over time indicating that the wheel slip ratio, $\lambda$, is headed away from the stable range. In other words, instability can be based calculating a wheel slip ratio, $\lambda$, outside of a stable range and/or a change in wheel slip ratio, $\lambda$, over time indicating that the wheel slip ratio, $\lambda$, is moving away from the stable range toward the unstable range shown in FIG. 3.

If the wheel slip ratio, $\lambda$, is stable, the process 500 returns to operation 504 and exhaust braking is maintained at its current level. If the wheel slip ratio, $\lambda$, is unstable, the process moves to operation 508 where the controller 116 can send a command to reduce exhaust braking. The command to reduce exhaust braking can include, for example, modifying a position of a component within the exhaust system 122 or a turbocharger of the vehicle to increase engine torque. The magnitude of the reduction in exhaust braking can be based on the value of the wheel slip ratio, $\lambda$, based on the rate of change of the wheel slip ratio, $\lambda$, over time, and/or based on whether the wheel slip ratio, $\lambda$, is headed toward or away from the stable range.

In operation 510, and based on a determination that exhaust braking has been reduced, the controller 116 can again determine the wheel slip ratio, $\lambda$, and the change in wheel slip ratio, $\lambda$, over time using input from vehicle sensors such as the wheel speed sensors 118a-d and sensors associated with output of the engine 120 as described above. In decision block 512, the controller 116 determines whether the change in wheel slip ratio, $\lambda$, over time is stabilizing. A stabilizing change in wheel slip ratio, $\lambda$, over time can be one where the change in wheel slip ratio, $\lambda$, over time indicates that the wheel slip ratio, λ, is headed toward the stable range. If the change in wheel slip ratio, λ, over time is not stabilizing, the process 500 returns to operation 508, and the controller 116 sends a command to further reduce exhaust braking.

If the change in wheel slip ratio, λ, over time is stabilizing, the process 500 moves to operation 514, and the controller 116 sends a command to increase exhaust braking. Increasing exhaust braking can include modifying a position of a component within the exhaust system 122 or a turbocharger of the vehicle to decrease engine torque. An example of the impact of operation 508, a reduction in exhaust braking, and operation 514, a subsequent increase in exhaust braking based on the change in wheel slip ratio, λ, over time stabilizing, is shown in FIGS. 4B and 4C by the rear wheel speed curve 406 moving from the relative low point 412 to the relative high point 416 and the engine torque curve 408 moving from the relative high point 414 to the relative low point 418. The magnitude of the increase in exhaust braking can be based on the value of the wheel slip ratio, λ and/or based on the rate of change of the wheel slip ratio, λ, over time.

In decision block 516, and based on a determination that exhaust braking has been increased, the controller 116 determines whether the amount of exhaust braking equals maximum exhaust braking, that is, whether maximum achievable exhaust braking (minimum possible engine torque during exhaust braking) is reached. If the amount of exhaust braking does not equal maximum exhaust braking, the process 500 returns to decision block 512 where a determination is made whether the change in wheel slip ratio, λ, over time is stabilizing. If the change in wheel slip ratio, λ, over time is stabilizing, the process 500 returns again to operation 514, and exhaust braking is further increased. An example of the difference between the actual value of exhaust braking and a maximum value of exhaust braking is shown in FIG. 4C by comparing the engine torque curve 408 to the minimum engine torque curve 410. If the amount of exhaust braking does equal maximum exhaust braking, the process 500 ends.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method of exhaust braking a vehicle, comprising:
    sending a command to activate exhaust braking;
    while the exhaust braking is active, determining a wheel slip ratio based on input from vehicle sensors; and
    in response to a determination that a wheel slip condition is unstable based on the wheel slip ratio:
        sending a command to reduce the exhaust braking;
        during a period of reduced exhaust braking, determining an updated wheel slip ratio based on updated input from the vehicle sensors;
        determining a change in the wheel slip ratio based on the updated input from the vehicle sensors;
        in response to a determination that the wheel slip condition is unstable based on the updated wheel slip ratio and based on a determination that the change in wheel slip ratio indicates the wheel slip condition will remain unstable, sending a command to reduce the exhaust braking; and
        in response to a determination that the wheel slip condition is unstable based on the updated wheel slip ratio and based on a determination that the change in wheel slip ratio indicates the wheel slip condition will become stable, sending a command to increase the exhaust breaking.

2. The method of claim 1, wherein the determination that the wheel slip condition is unstable is based on a predetermined drop in speed for one or more wheels of the vehicle as compared to a vehicle speed.

3. The method of claim 1, wherein the determination that the wheel slip condition is unstable is based on the wheel slip ratio being outside a range indicating that the wheel slip condition is stable.

4. The method of claim 3, wherein the determination that the wheel slip condition is unstable is based on a change in the wheel slip ratio indicating that the wheel slip ratio is headed away from a range indicating that the wheel slip condition is stable.

5. The method of claim 3, wherein the determination that the change in wheel slip ratio indicates the wheel slip condition will become stable is based on the change in wheel slip ratio indicating that the wheel slip ratio is headed toward the range indicating that the wheel slip condition is stable.

6. The method of claim 1, wherein reducing the exhaust braking includes modifying a position of a component within one of an exhaust system and a turbocharger of the vehicle to increase engine torque.

7. The method of claim 1, wherein increasing the exhaust braking includes modifying a position of a component within one of an exhaust system and a turbocharger of the vehicle to decrease engine torque.

8. The method of claim 1, further comprising:
    in response to a determination that the wheel slip condition is unstable based on the change in wheel slip ratio, sending a command to further reduce the exhaust braking.

9. The method of claim 1, further comprising:
    in response to a determination that the exhaust braking is increased, determining whether the exhaust breaking equals a maximum exhaust braking based on input from the vehicle sensors;
    in response to a determination that the exhaust braking does not equal the maximum exhaust braking, determining a change in wheel slip ratio during a period of increased exhaust braking based on input from the vehicle sensors; and
    in response to a determination that the wheel slip condition is stable based on the change in wheel slip ratio during the period of increased exhaust braking, sending a command to further increase the exhaust braking.

10. A controlling component, comprising:
    a non-transitory memory; and
    a processor configured to execute instructions stored in the non-transitory memory to:
        send a command to activate exhaust braking;
        while the exhaust braking is active, determine a wheel slip ratio based on input from vehicle sensors; and
        in response to a determination that a wheel slip condition is unstable based on the wheel slip ratio:
            send a command to reduce the exhaust braking;
            during a period of reduced exhaust braking, determine an updated wheel slip ratio based on updated input from the vehicle sensors;

determine a change in the wheel slip ratio based on the updated input from the vehicle sensors;

in response to a determination that the wheel slip condition is unstable based on the updated wheel slip ratio and based on a determination that the change in wheel slip ratio indicates the wheel slip condition will remain unstable, send a command to reduce the exhaust braking; and in response to a determination that the wheel slip condition is unstable based on the updated wheel slip ratio and based on a determination that the change in wheel slip ratio indicates the wheel slip condition will become stable, send a command to increase the exhaust breaking.

11. The controlling component of claim 10, wherein the determination that the wheel slip condition is unstable is based on the wheel slip ratio being outside a range indicating that the wheel slip condition is stable and on a change in wheel slip ratio indicating that the wheel slip ratio is headed away from the range indicating that the wheel slip condition is stable.

12. The controlling component of claim 11, wherein the determination that the change in wheel slip ratio indicates the wheel slip condition will become stable is based on the change in the wheel slip ratio indicating that the wheel slip ratio is headed toward the range indicating that the wheel slip condition is stable.

13. The controlling component of claim 10, wherein reducing the exhaust braking and increasing the exhaust braking include modifying a position of a component within one of an exhaust system and a turbocharger of a vehicle to respectively increase and decrease engine torque.

14. The controlling component of claim 10, wherein the processor is further configured to:

in response to a determination that the wheel slip condition is unstable based on the change in wheel slip ratio, send a command to further reduce the exhaust braking.

15. The controlling component of claim 10, wherein the processor is further configured to:

in response to a determination that the exhaust braking is increased, determine whether the exhaust braking equals a maximum exhaust braking based on input from the vehicle sensors;

in response to a determination that the exhaust braking does not equal the maximum exhaust braking, determine the change in wheel slip ratio during a period of increased exhaust braking based on input from the vehicle sensors; and in response to a determination that the wheel slip condition is stable based on the change in wheel slip ratio during the period of increased exhaust braking, send a command to further increase the exhaust braking.

16. A vehicle, comprising:

sensors disposed on the vehicle; and a controlling component in communication with the vehicle sensors, comprising:
a non-transitory memory; and
a processor configured to execute instructions stored in the non-transitory memory to:

send a command to activate exhaust braking;

while the exhaust braking is active, determine a wheel slip ratio based on input from the vehicle sensors;

in response to a determination that a wheel slip condition is unstable based on the wheel slip ratio, send a command to reduce the exhaust braking;

in response to a determination that the wheel slip condition is stable based on the wheel slip ratio, maintain the exhaust braking at a current level;

during a period of reduced exhaust braking, determine an updated wheel slip ratio based on updated input from the vehicle sensors;

determine a change in wheel slip ratio based on the updated input from the vehicle sensors;

in response to a determination that the wheel slip condition is unstable based on the updated wheel slip ratio and based on a determination that the change in wheel slip ratio indicates the wheel slip condition will remain unstable, send a command to reduce the exhaust braking; and in response to a determination that the wheel slip condition is unstable based on the updated wheel slip ratio and based on a determination that the change in wheel slip ratio indicates the wheel slip condition will become stable, send a command to increase the exhaust braking.

17. The vehicle of claim 16, wherein the determination that the wheel slip condition is unstable is based on the wheel slip ratio outside a range indicating that the wheel slip condition is stable and on a change in wheel slip ratio indicating that the wheel slip ratio is headed away from the range indicating that the wheel slip condition is stable.

18. The vehicle of claim 17, wherein the determination that the change in wheel slip ratio indicates the wheel slip condition will become stable is based on the change in wheel slip ratio indicating that the wheel slip ratio is headed toward the range indicating that the wheel slip condition is stable.

19. The vehicle of claim 16, wherein reducing the exhaust braking and increasing the exhaust braking include modifying a position of a component within one of an exhaust system and a turbocharger of the vehicle to respectively increase and decrease engine torque.

20. The vehicle of claim 16, wherein the processor is further configured to:

in response to a determination that the exhaust braking is increased, determine whether the exhaust braking equals a maximum exhaust braking based on input from the vehicle sensors;

in response to a determination that the exhaust braking does not equal the maximum exhaust braking, determine the change in wheel slip ratio during a period of increased exhaust braking based on input from the vehicle sensors; and in response to a determination that the wheel slip condition is stable based on the change in wheel slip ratio during the period of increased exhaust braking, send a command to further increase the exhaust braking.

* * * * *